(12) United States Patent  (10) Patent No.: US 7,874,774 B2
Peterson  (45) Date of Patent: Jan. 25, 2011

(54) VEHICLE CARGO ARRANGEMENT

(75) Inventor: Blake Peterson, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 657 days.

(21) Appl. No.: 11/858,234

(22) Filed: Sep. 20, 2007

(65) Prior Publication Data
US 2009/0080995 A1  Mar. 26, 2009

(51) Int. Cl.
*B60P 7/08*  (2006.01)
(52) U.S. Cl. ...................... 410/104; 410/106
(58) Field of Classification Search ................ 410/104, 410/105, 106, 110; 114/218; 24/115 K, 24/265 CD; 248/499
See application file for complete search history.

(56) References Cited

U.S. PATENT DOCUMENTS

| | | | |
|---|---|---|---|
| 2,110,435 A | 3/1938 | Albin | |
| 2,602,691 A | 7/1952 | Doty | |
| 2,685,848 A | 8/1954 | Meighan et al. | |
| 2,688,289 A | 9/1954 | Sterling | |
| 2,696,139 A | 12/1954 | Attwood | |
| 2,736,272 A | 2/1956 | Elsner | |
| 3,005,292 A | 10/1961 | Reiland | |
| 3,053,355 A | 9/1962 | Attwood | |
| 3,169,792 A | 2/1965 | Viquez | |
| 3,241,501 A | 3/1966 | Watts | |
| 3,478,995 A | 11/1969 | Lautzenhiser et al. | |
| 3,643,973 A | 2/1972 | Bott | |
| 3,658,012 A | 4/1972 | Caringi | |
| 3,722,910 A | 3/1973 | Heckenlaible | |
| 3,802,138 A | 4/1974 | McCarter | |
| 3,831,976 A | 8/1974 | Iden, Sr. | |
| 3,877,671 A | 4/1975 | Underwood et al. | |
| 3,951,444 A | 4/1976 | Shull | |
| 3,972,500 A | 8/1976 | Johnson et al. | |
| 4,109,891 A | 8/1978 | Grendahl | |

(Continued)

FOREIGN PATENT DOCUMENTS

EP  628738 A1  12/1994

(Continued)

OTHER PUBLICATIONS

Article—Toyota's 2001 Toyota Matrix—Truckworld Online!; http://www.truckworld.com/Sport-Utility/01-toyota-matrix/01-toyotamatrix.html; Mar. 7, 2001, 4 pages.
Article—Superstrut, "Superstruts Products From BCR, Inc., Building Specialties", pp. 1-4.
Article—Superstrut, "Metal Framing Channel & Pipe Hangers-Typical Applications", pp. 1-4 (1984).
Article—Hi-Lift.com web site; Oct. 16, 2001 (8 pgs.).
Article—Ford Motor Company, "Mercury accessories", pp. 1-23.
Article—TracRac, "The Ultimate Sliding Truck Rack System", TracRac, Fall River, MA, 1 page.
Article-BCR, Inc, Building Specialties, Aickinstrut Structures and Fasteners, Aickinstrut, Inc., pp. A-D.
Article—TracRac, "Packing Check List", TracRac, Fall River, MA, 2 pages (1998).

(Continued)

*Primary Examiner*—Stephen Gordon
(74) *Attorney, Agent, or Firm*—Global IP Counselors, LLP

(57) ABSTRACT

A vehicle cargo arrangement has a track with an elongated slot and a tie-down assembly. The tie-down assembly includes a tie-down fitting, a retainer coupled to the tie-down fitting to selectively retain the tie-down fitting to the track, and a blocking part. The blocking part is movably coupled with respect to the tie-down fitting between a blocked orientation and an unblocked orientation. The tie-down assembly is removable from the track by rotational movement when the blocking part is in the unblocked orientation. However, the tie-down assembly is not removable from the track by the rotational movement when the blocking part is in the blocked orientation.

17 Claims, 13 Drawing Sheets

U.S. PATENT DOCUMENTS

| | | |
|---|---|---|
| 4,132,335 A | 1/1979 | Ingram |
| 4,168,668 A | 9/1979 | Grube et al. |
| 4,226,465 A | 10/1980 | McCullough |
| 4,239,139 A | 12/1980 | Bott |
| 4,244,501 A | 1/1981 | Ingram |
| 4,248,558 A | 2/1981 | Lechner |
| 4,270,681 A | 6/1981 | Ingram |
| 4,278,376 A | 7/1981 | Hunter |
| 4,285,379 A | 8/1981 | Kowalski |
| 4,396,324 A | 8/1983 | Ellis |
| 4,410,298 A | 10/1983 | Kowalski |
| 4,449,875 A | 5/1984 | Brunelle |
| 4,469,261 A | 9/1984 | Stapleton et al. |
| 4,500,020 A | 2/1985 | Rasor |
| 4,545,697 A | 10/1985 | Verdenne et al. |
| 4,575,295 A | 3/1986 | Rebentisch |
| 4,630,982 A | 12/1986 | Fenner |
| 4,666,355 A | 5/1987 | Stover |
| 4,708,549 A | 11/1987 | Jensen |
| 4,717,298 A | 1/1988 | Bott |
| 4,739,528 A | 4/1988 | Allen |
| 4,741,582 A | 5/1988 | Peroni |
| 4,778,092 A | 10/1988 | Grace |
| 4,784,552 A | 11/1988 | Rebentisch |
| 4,827,742 A | 5/1989 | McDonald |
| 4,840,525 A | 6/1989 | Rebentisch |
| 4,850,063 A | 7/1989 | Abbate |
| 4,850,769 A | 7/1989 | Matthews |
| 4,887,947 A | 12/1989 | Bott |
| 4,911,348 A | 3/1990 | Rasor et al. |
| 4,915,342 A | 4/1990 | Nilsson |
| 4,941,702 A | 7/1990 | Southward |
| D310,017 S | 8/1990 | Matthews |
| 4,948,313 A | 8/1990 | Zankovich |
| 4,950,099 A | 8/1990 | Roellin |
| 4,955,771 A | 9/1990 | Bott |
| 4,961,553 A | 10/1990 | Todd |
| 4,969,784 A | 11/1990 | Yanke |
| 4,984,726 A | 1/1991 | Marshall |
| 5,044,856 A | 9/1991 | Jerabek |
| 5,137,403 A | 8/1992 | McCaffrey |
| 5,143,415 A | 9/1992 | Boudah |
| 5,154,385 A | 10/1992 | Lindberg et al. |
| 5,165,628 A | 11/1992 | Todd et al. |
| 5,188,479 A | 2/1993 | Nehls |
| 5,199,836 A | 4/1993 | Gogarty |
| 5,209,619 A | 5/1993 | Rinderer |
| 5,228,736 A | 7/1993 | Dutton |
| 5,259,711 A | 11/1993 | Beck |
| 5,271,586 A | 12/1993 | Schmidt |
| 5,297,888 A | 3/1994 | Nehls |
| 5,316,357 A | 5/1994 | Schroeder |
| 5,366,327 A | 11/1994 | Nelson |
| 5,370,488 A | 12/1994 | Sykes |
| 5,409,335 A | 4/1995 | Beck |
| 5,411,356 A | 5/1995 | Travis et al. |
| 5,433,550 A | 7/1995 | Huber |
| 5,433,566 A | 7/1995 | Bradley |
| 5,494,388 A | 2/1996 | Stevens |
| 5,533,848 A | 7/1996 | Davis |
| 5,560,666 A | 10/1996 | Vieira et al. |
| 5,628,598 A | 5/1997 | Hofle |
| 5,655,865 A | 8/1997 | Plank et al. |
| 5,674,033 A | 10/1997 | Ruegg |
| 5,676,508 A | 10/1997 | Weicht |
| 5,690,460 A | 11/1997 | Attanasio |
| 5,704,571 A | 1/1998 | Vargo |
| 5,765,978 A | 6/1998 | Looker et al. |
| 5,775,652 A | 7/1998 | Crawshaw et al. |
| 5,779,412 A | 7/1998 | Nagai et al. |
| 5,794,901 A | 8/1998 | Sigel |
| 5,820,322 A | 10/1998 | Hermann et al. |
| 5,823,724 A | 10/1998 | Lee |
| 5,823,727 A | 10/1998 | Lee |
| 5,827,023 A | 10/1998 | Stull |
| 5,893,538 A | 4/1999 | Onishi et al. |
| 5,915,900 A | 6/1999 | Boltz |
| 5,947,356 A | 9/1999 | Delong |
| 5,961,263 A | 10/1999 | Nunez |
| 5,975,822 A | 11/1999 | Ruff |
| 6,010,287 A | 1/2000 | Sommermeyer et al. |
| 6,017,071 A | 1/2000 | Morghen |
| 6,022,164 A | 2/2000 | Tsui et al. |
| 6,050,763 A | 4/2000 | Swailes |
| RE36,681 E | 5/2000 | Rinderer |
| 6,059,498 A | 5/2000 | Ostrowski |
| 6,086,300 A | 7/2000 | Frohlich |
| 6,113,328 A | 9/2000 | Claucherty |
| 6,196,777 B1 | 3/2001 | Price |
| 6,213,539 B1 | 4/2001 | Williams et al. |
| 6,238,153 B1 | 5/2001 | Karrer |
| 6,250,861 B1 | 6/2001 | Whitehead |
| 6,260,813 B1 | 7/2001 | Whitcomb |
| D446,442 S | 8/2001 | Simpson |
| 6,270,301 B1 | 8/2001 | Dunlop |
| 6,290,426 B1 | 9/2001 | van Gijsel et al. |
| 6,334,750 B1 | 1/2002 | Hsieh |
| 6,336,766 B1 | 1/2002 | De Villele |
| 6,336,779 B1 | 1/2002 | Jakob et al. |
| 6,338,599 B1 | 1/2002 | Uno |
| 6,338,649 B1 | 1/2002 | Smith |
| 6,439,814 B1 | 8/2002 | Floe |
| 6,585,465 B1 | 7/2003 | Hammond et al. |
| 6,592,310 B2 | 7/2003 | Hyp et al. |
| 6,626,623 B2 * | 9/2003 | DeLay .................. 410/116 |
| 6,644,901 B2 | 11/2003 | Breckel |
| 6,827,531 B2 | 12/2004 | Womack et al. |
| 6,910,609 B2 | 6/2005 | Williams et al. |
| 2002/0048495 A1 | 4/2002 | Anderson et al. |
| 2002/0164225 A1 | 11/2002 | Snyder et al. |
| 2005/0036848 A1 | 2/2005 | Cunningham et al. |
| 2005/0145662 A1 | 7/2005 | Williams et al. |

FOREIGN PATENT DOCUMENTS

WO    WO-2004/094194 A1    11/2004

OTHER PUBLICATIONS

Brochure—Hi-Lift® The Original Jacks, Bloomfield Manufacturing Co., Inc., 2001, cover page, pp. 6 and 7.
Article—Toyota's 2001 Toyota Matrix—"Connect. toyota.com/matrix," Toyota Motor Sales, U.S.A., 4 pages.
Article-SystemOne Modular Truck Equipment, Christensen Manufacturing, http:www.christensenmfg.com/; Jul. 27, 2000, 1 page.
Article—TracRac, "The Ultimate Van Rack", TracRac, Fall River, MA, 1 page.
Article—Detroit Auto Show 2001-Toyota Matrix:http://203.139.122. 131/motorshow/international/matrix/matrix--4.html; Mar. 14, 2001, 2 page.
Article—Superstrut, "Total Support Systems", Superstrut Division-Illustrated Price List, pp. 1-41 (1986).
Article-Unistrut Los Angeles, "Unistrut framing systems for Maintenance Supervisors, Design Engineers, Plant Engineers", pp. 1-31.
Article—Mirage Truck Rack; "The Original Disappearing Rack"; U.S. Patent 5,143,415; Mirage truck rack accessories; http:www.altech.ab. ca/jembrack/mirage3.htm; Nov. 14, 2000, 2 pages.
Article—MaxRax "The Solution to Your Hauling Problem", http:www. truckracks.com/; Jul. 27, 2000, 1 page.
Article—Saddlepack Storage Systems for Long Bed Trucks by Steel Horse, TruckStuff USA, http://www.truckstuffusa.com/ste58202. html; Jul. 27, 2000, 1 page.

Dialog File 228; U.S. Trademark registrations 1,824,078; 1,613,372 and 828,807, "Slide-N-Lock".

Article—Midland-Ross Corporation, "Goldguard-New standard in corrosion protection from Superstrut", Superstrut Division, Oakland, CA, 1 page.

Article-B-Line Systems Inc., "Strut Systems", Engineering Catalog, pp. 1-176.

Article-Unistrut, General Engineering Catalog, pp. 1-126.

Article—SystemOne Modular Truck Equipment, Christensen Manufacturing, http:www.christensenmfg.com/html/features.html; Jul. 27, 2000, 2 pages.

Article-Midland-Ross Corporation, "Superstrut-The Complete Line. One Source.", Superstrut Division, Oakland, CA, 1 page.

Ringbolts, Tie Down Rings & Pad Eyes; printed Aug. 1, 2005; http://www.mcmaster.com.

* cited by examiner

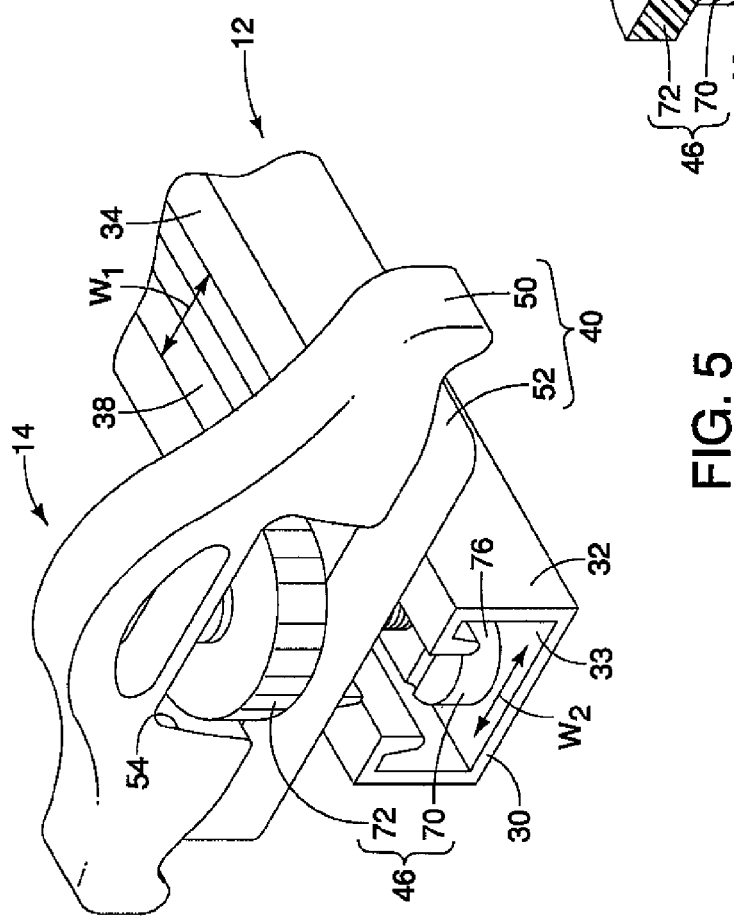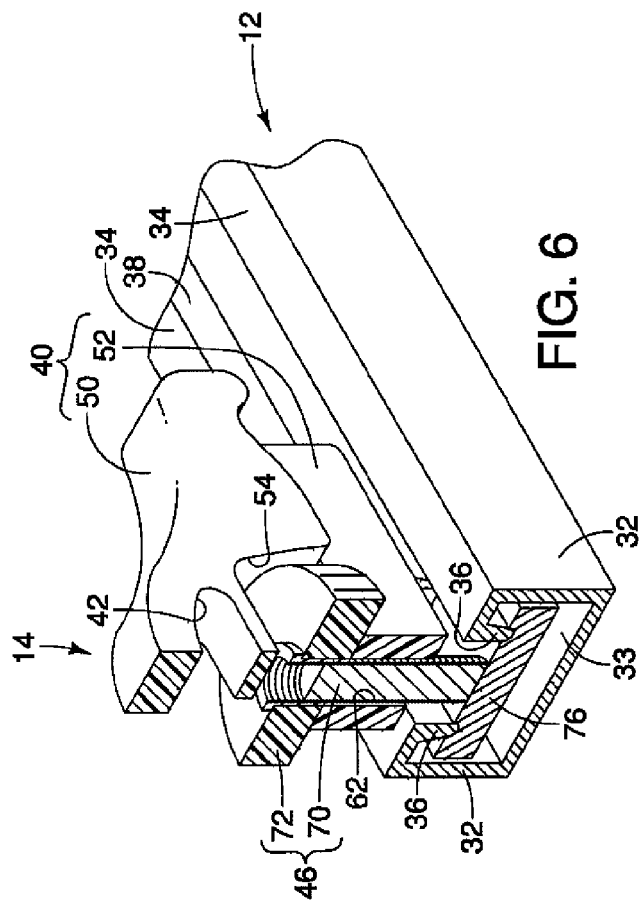

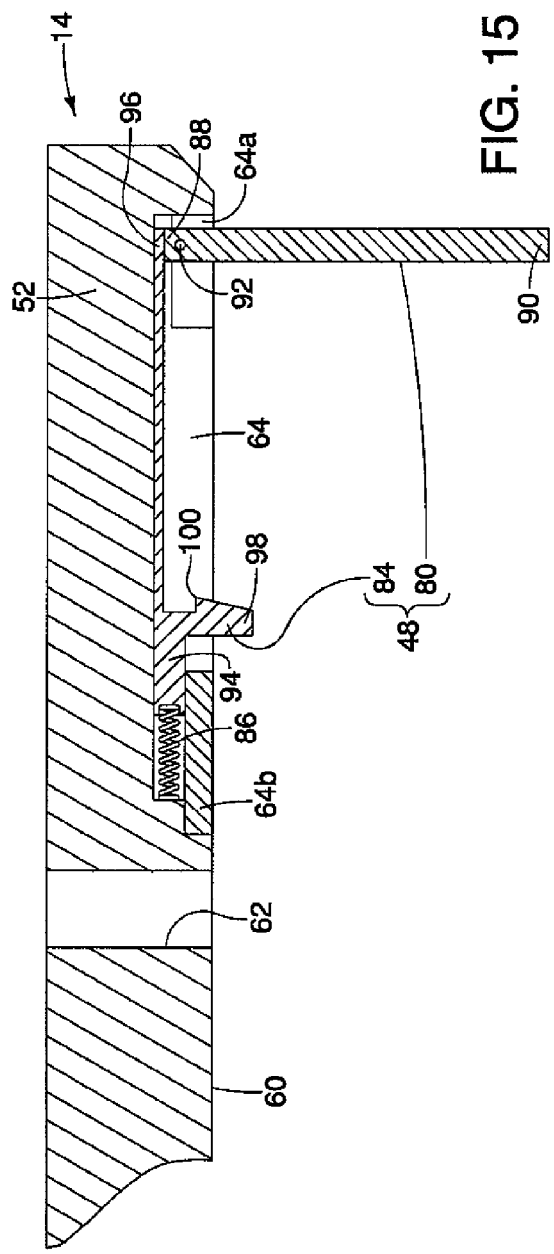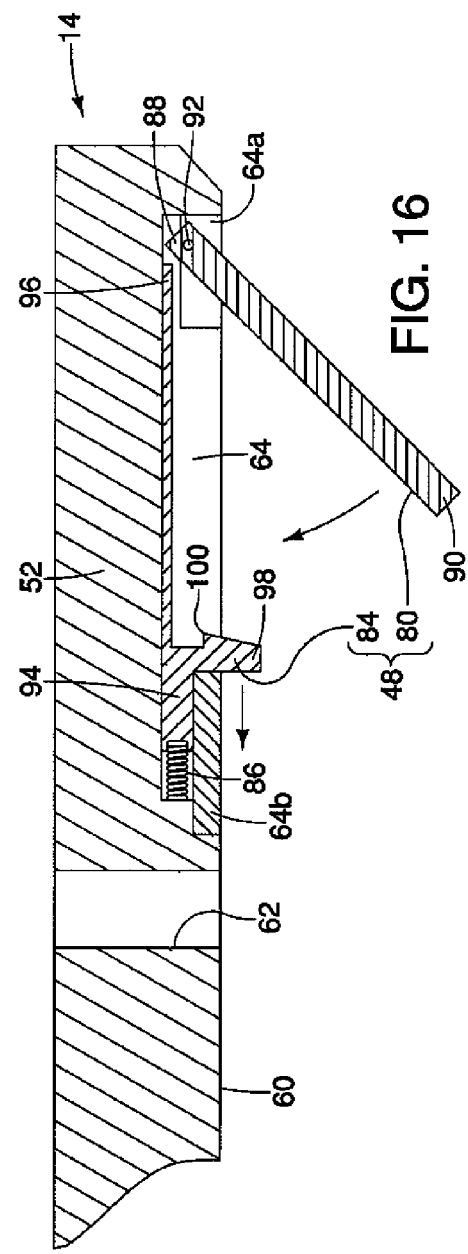

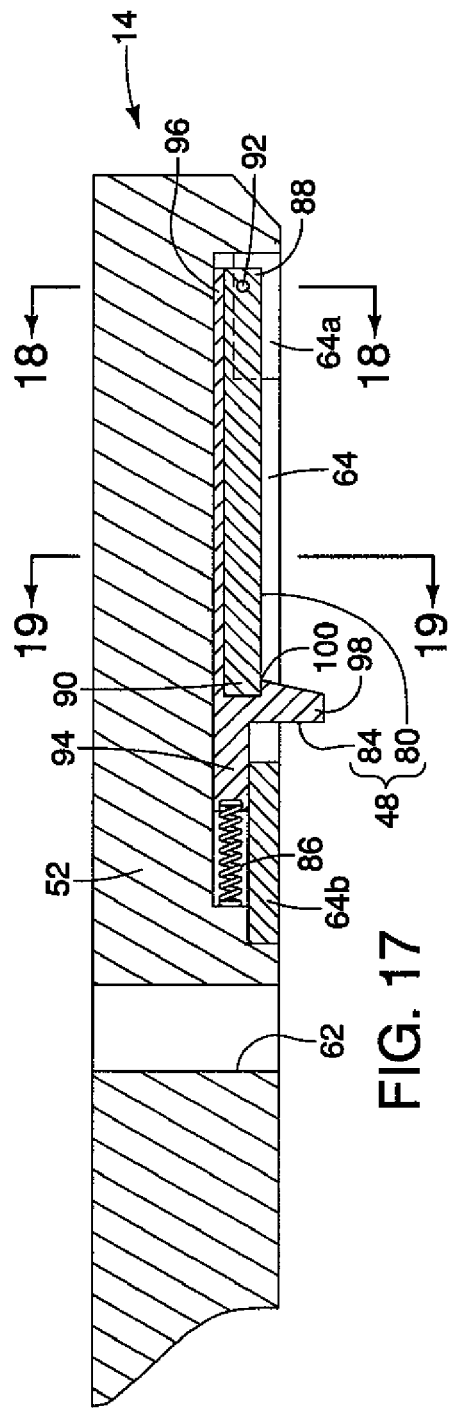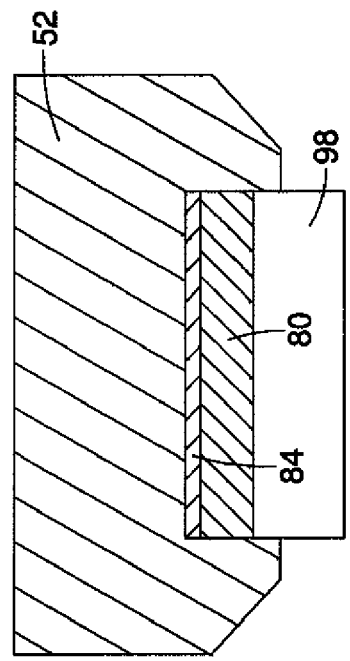

VEHICLE CARGO ARRANGEMENT

BACKGROUND OF THE INVENTION

1. Field of the Invention

The present invention relates to vehicle cargo arrangement that includes a track and tie-down assembly. More specifically, the present invention relates to tie-down assembly that is selectively positionable at various positions along the length of the track.

2. Background Information

Vehicles such as pickup trucks typically include a cargo area and some means for tying down or otherwise securing a cargo load. In recent model years, some pickup trucks have been provided with utility tracks fixed to side walls and cargo bed surfaces of the cargo area. Such tracks are configured to receive cleat members and/or tie-down assemblies that include hooks or looped portions that can receive rope or the like for securing cargo within the cargo area.

Many such tie-down assemblies are currently available. One such tie-down assembly includes a retainer that fits into a hollow portion of the track. The retainer has a width that is slightly less than an opening or slot in the track, but a length that is greater than the opening or slot in the track. The retainer can be inserted into the slot of the track and rotated 90 degrees to engage walls of the track. A tightening member associated with the retainer pulls the retainer toward a main body of the tie-down assembly and against the walls of the track such that the tie-down assembly can be clamped in place relative to the track. Removing the tie-down assembly is accomplished by loosening the tightening member, then rotating the tie-down assembly and the retainer 90 degrees and pulling the clamping member out through the slot.

A problem with such tie-down assemblies is that there is no way to prevent the removal of the tie-down assembly from the tracks and the cargo area of the vehicle.

In view of the above, it will be apparent to those skilled in the art from this disclosure that there exists a need for an improved tie-down assembly. This invention addresses this need in the art as well as other needs, which will become apparent to those skilled in the art from this disclosure.

SUMMARY OF THE INVENTION

One object of the present invention is to provide a tie-down assembly with a locking capability where the tie-down assembly is selectively positionable along the length of a track, but cannot be removed from the track until removal is required or desired.

In accordance with one embodiment of the present invention, a vehicle cargo arrangement has a track including an elongated slot and a tie-down assembly. The tie-down assembly includes a tie-down fitting, a retainer coupled to the tie-down fitting to selectively retain the tie-down fitting to the track, and a blocking part. The blocking part is movably coupled with respect to the tie-down fitting between a blocked orientation and an unblocked orientation such that the tie-down assembly is removable from the track by rotational movement when the blocking part is in the unblocked orientation and such that the tie-down assembly is not removable from the track by the rotational movement in when the blocking part is in the blocked orientation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is another perspective view of the portion of the track and the tie-down assembly, similar to FIG. 4, showing a first step in the installation of the retainer of the tie-down assembly to the track, with the retainer inserted into an elongated slot of the track in accordance with one embodiment of the present invention;

FIG. 6 is another perspective view of the portion of the track and the tie-down assembly shown in cross-section, showing details of the main body and the retainer of tie-down assembly in an installed orientation relative to the track in accordance with one embodiment of the present invention;

FIG. 15 is a cross-sectional view of a portion of the tie-down assembly showing the various elements of the blocking mechanism in the blocked orientation in accordance with one embodiment of the present invention;

FIG. 16 is another cross-sectional view of a portion of the tie-down assembly similar to FIG. 15, showing the various elements of the blocking mechanism in an intermediate orientation between the blocked orientation and an unblocked orientation in accordance with one embodiment of the present invention;

FIG. 17 is another cross-sectional view of a portion of the tie-down assembly similar to FIGS. 15 and 16, showing the various elements of the blocking mechanism in the unblocked orientation in accordance with one embodiment of the present invention;

FIG. 18 is a cross sectional view of a portion of the tie-down assembly taken along the line 18-18 in FIG. 17 in accordance with one embodiment of the present invention;

FIG. 19 is a cross sectional view of a portion of the tie-down assembly taken along the line 19-19 in FIG. 17 in accordance with one embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
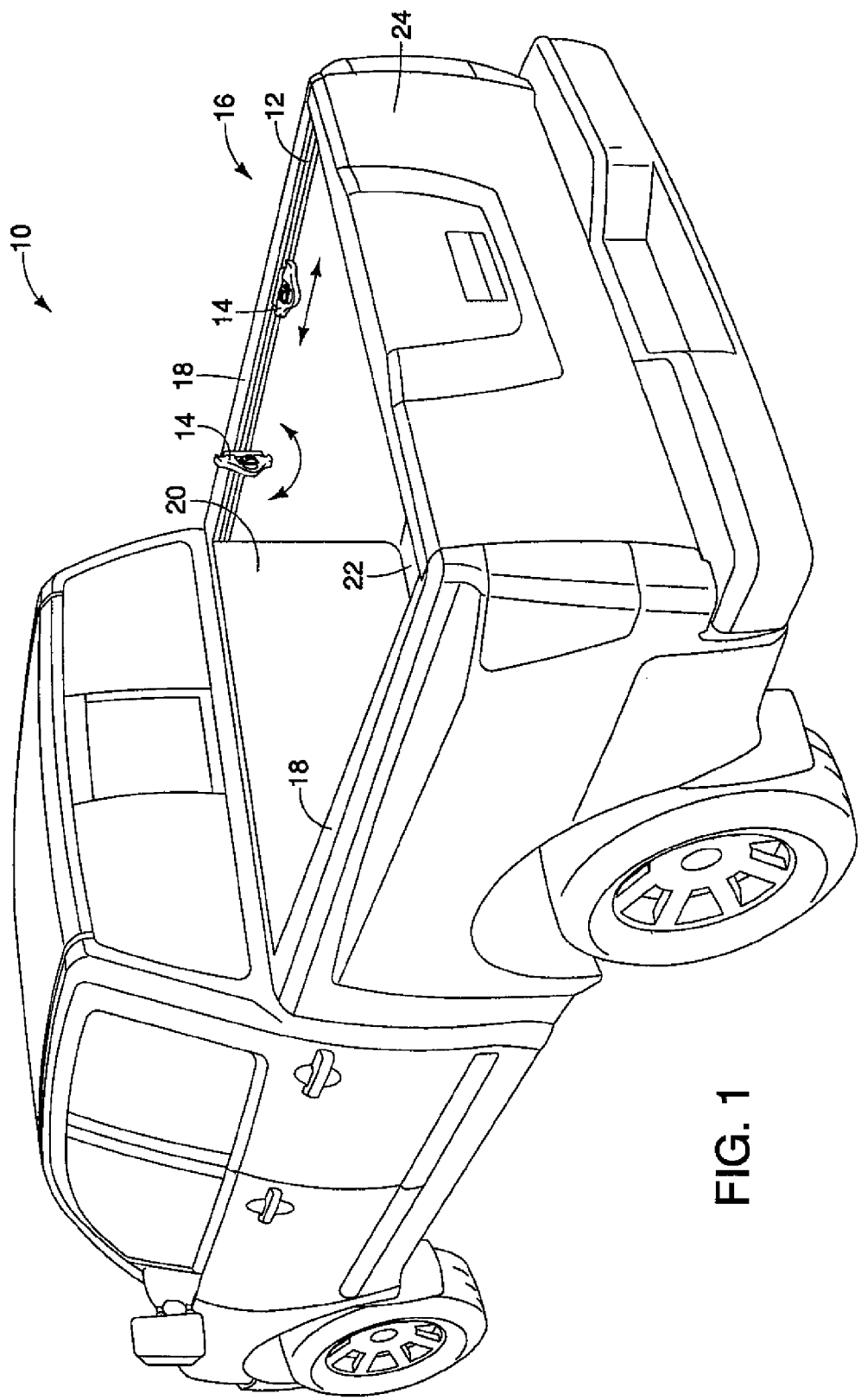
FIG. 1 is a perspective view of a vehicle showing a cargo area of the vehicle with a tailgate in a closed position and including a plurality tracks and a plurality of tie-down assemblies installed in one of the tracks in accordance with one embodiment of the present invention.

Referring initially to FIG. 1, a vehicle 10 is illustrated having tracks 12 and tie-down assemblies 14 in accordance with a first embodiment of the present invention. The vehicle 10 is shown as a pickup truck. However, it will be understood from the drawings and the description below that the present invention is applicable to any of a variety of vehicles where a cargo space is provided within a portion of the vehicle or on a surface of the vehicle.

Figure 2:
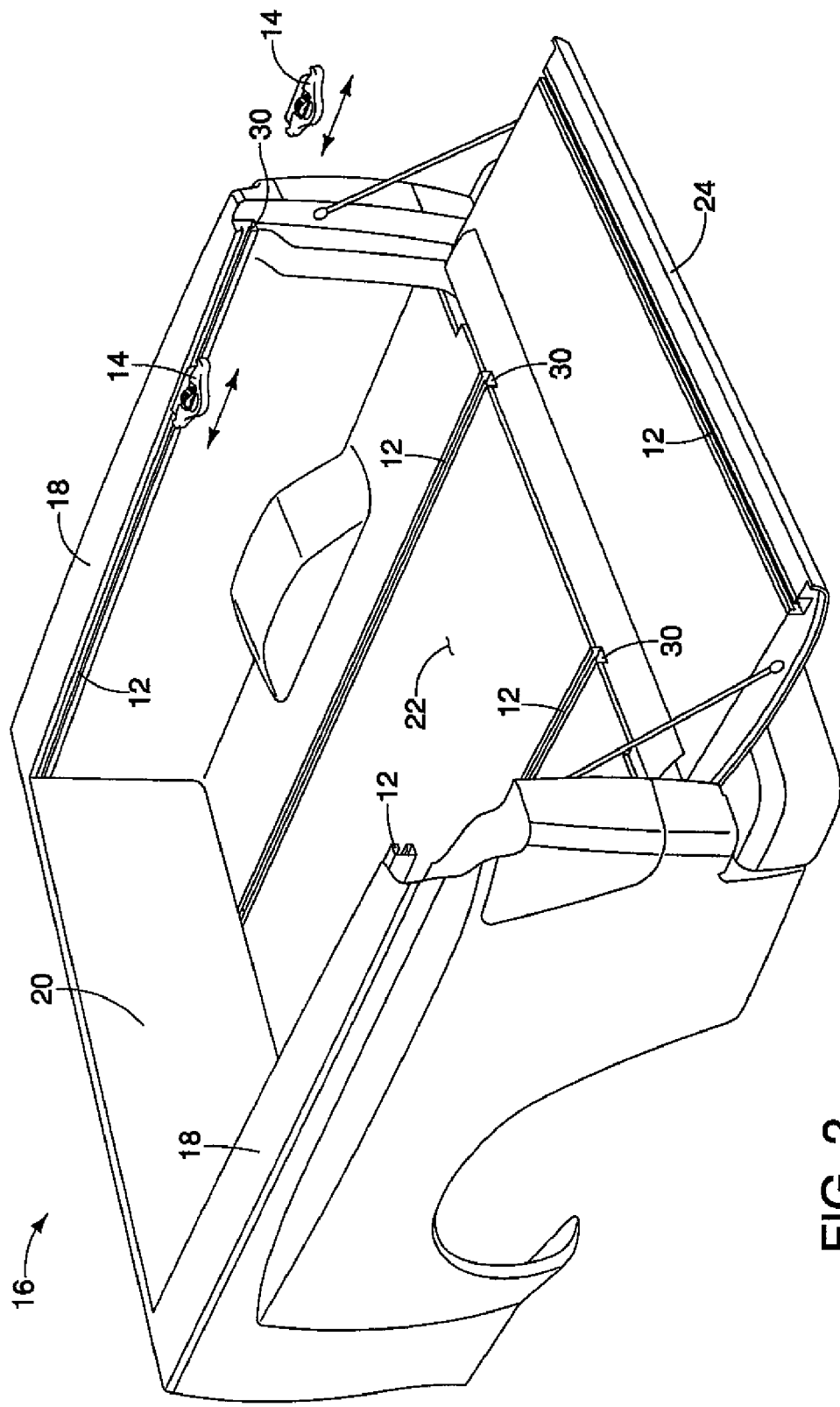
FIG. 2 is a perspective view of the cargo area of the vehicle with the tailgate in an open position showing the tie-down assemblies being slidably removable via an open end of the track exposed by the open tailgate in accordance with one embodiment of the present invention.
Figure 3:
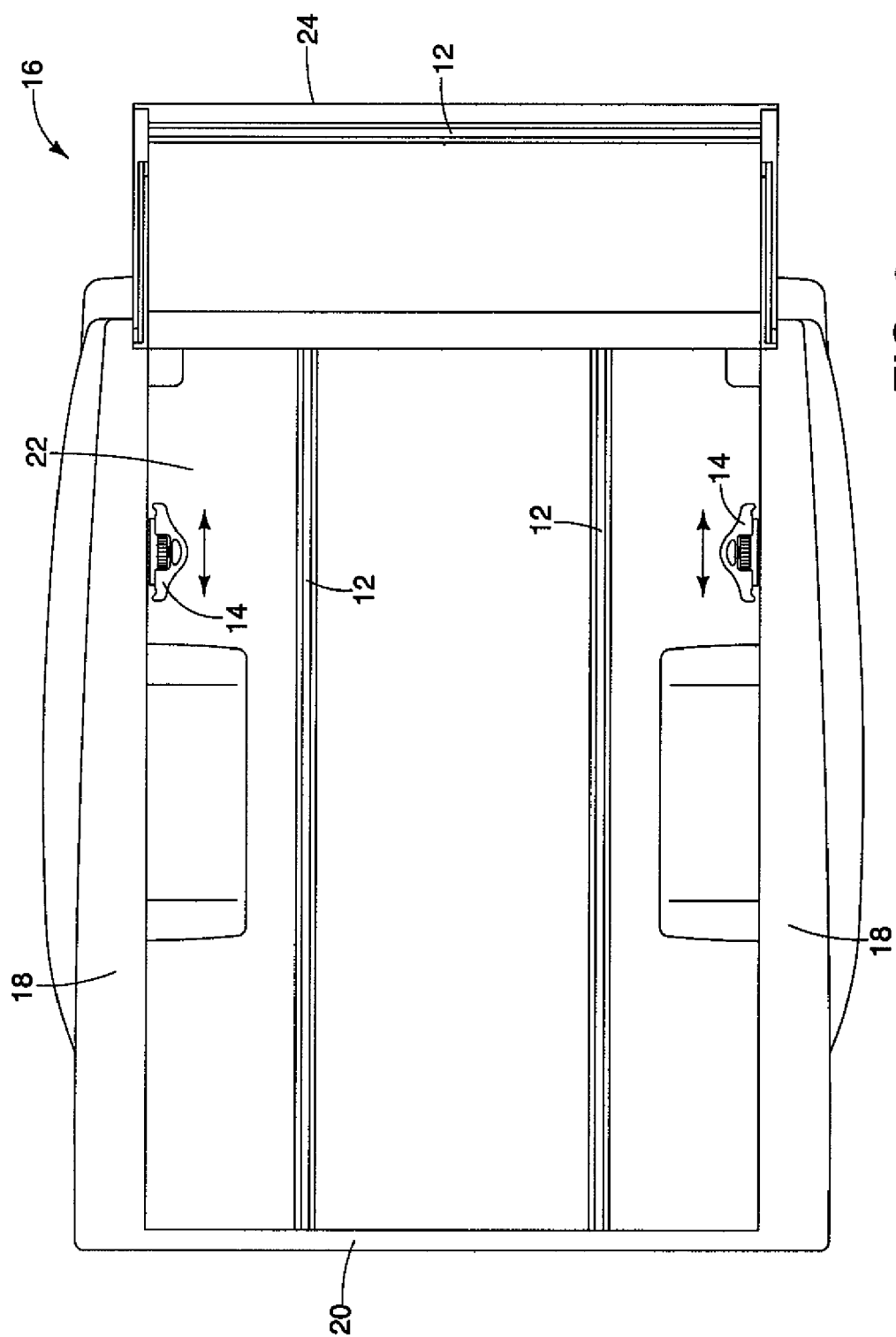
FIG. 3 is a top view of the cargo area of the vehicle with the tailgate in an open position showing a pair of tie-down assemblies installed in two of the tracks in accordance with one embodiment of the present invention.

As best shown in FIGS. 2 and 3, the vehicle 10 includes a cargo area 16 that is defined by a pair of side walls 18, a front wall 20, a bed surface 22 and a tailgate 24. The vehicle 10 includes a plurality of the tracks 12, as shown in FIGS. 2 and 3. Specifically, the tracks 12 are provided on both vertical and horizontal surfaces such as the pair of side walls 18, the bed surface 22 and the tailgate 24.

The tailgate 24 is movable between a closed position shown in FIG. 1 and an open position shown in FIGS. 2 and 3.

The tracks 12 are secured to the appropriate surface by mechanical fasteners (not shown) such as bolts and/or rivets or welded in position. Alternatively, the tracks 12 can be unitarily formed with the side walls 18, the front wall 20, the bed surface and/or the tailgate 24. The vehicle 10 can be provided with the tracks 12 from the factory, or the tracks 12 can be added on to cargo area 16 of the vehicle 10 as an after-market installation. Regardless of the location, each of the tracks 12 are preferably all similar or the same.

Figure 4:
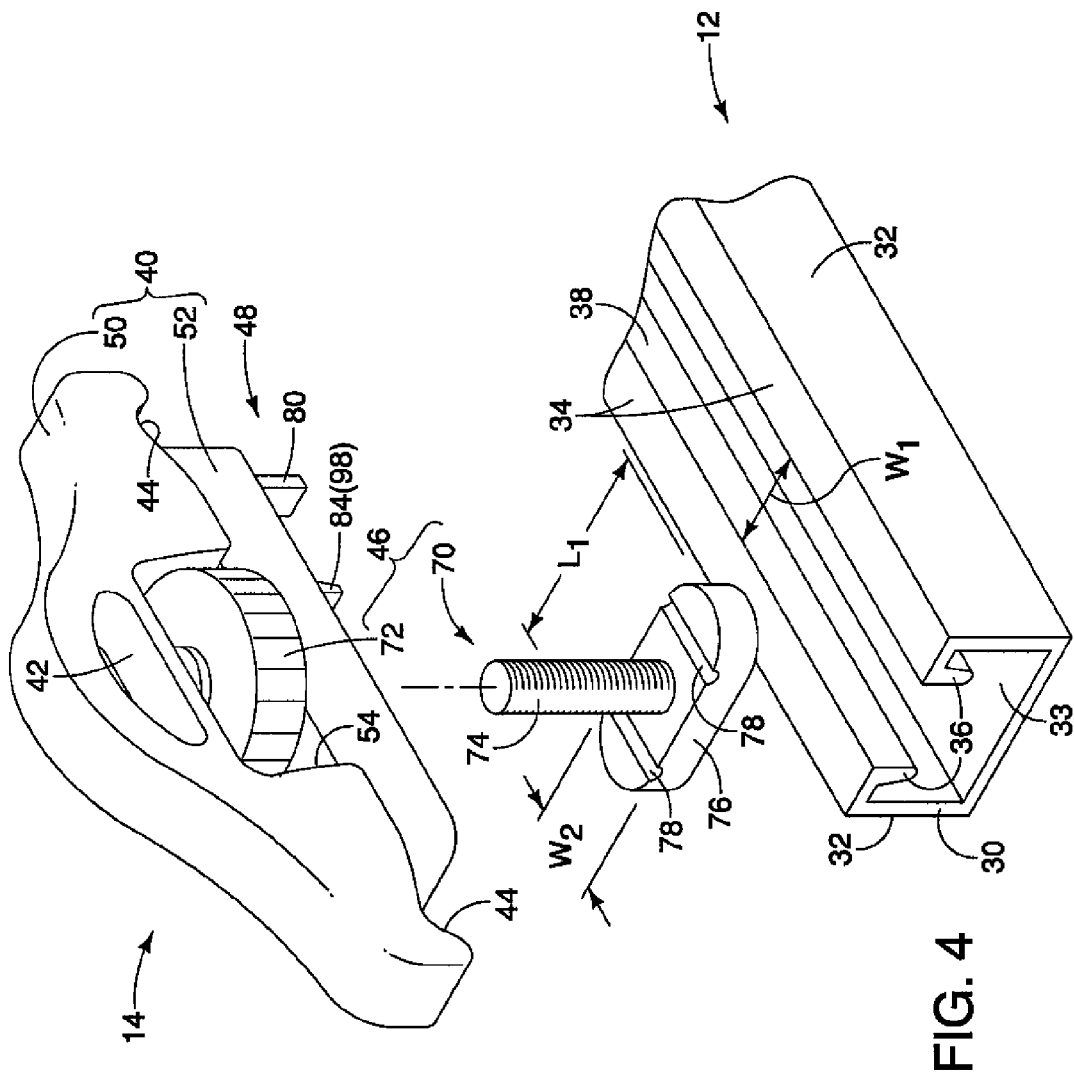
FIG. 4 is an exploded perspective view of a portion of one of the tracks and one tie-down assembly showing a retainer, a tightening member and a main body of the tie-down assembly in accordance with one embodiment of the present invention.

As best shown in FIG. 4, each of the tracks 12 is basically a U-shaped channel that includes an open end 30, a pair of generally parallel side walls 32, a back wall 33, parallel outer wall portions 34 and inwardly extending projections 36. An elongated slot 38 is defined between the parallel outer wall portion 34 and the inwardly extending projections 36. The slot 38 has a width $W_1$. The parallel side walls 32 and the parallel outer wall portion 34 define a hollow interior of the track 12. It should be understood from the drawings and the description herein that the profile of each of the tracks 12 is preferably uniform throughout their respective lengths. More specifically, the inwardly extending projections 36 and the parallel outer wall portions 34 preferably extend the entire length of the track 12.

It should be understood from the drawings that with the tailgate 24 in the closed position shown in FIG. 1, the open end 30 of each of the tracks 12 is blocked. As is described below, with the open end 30 blocked by the tailgate 24, the tie-down assemblies 14 cannot be slid out through the open end 30. Conversely, with the tailgate 24 in the open position shown in FIGS. 2 and 3, the tie-down assemblies 14 can slide out of the tracks 12 via the open end 30.

The vehicle 10 can be provided with a plurality of the tie-down assemblies 14. In a preferred embodiment, all of the tie-down assemblies 14 are identical. Therefore, description of one tie-down assembly 14 applies to all of the tie-down assemblies 14.

As best shown in FIG. 4, the tie-down assembly 14 basically includes a main body 40, a first tie-down fitting 42, a pair of tie-down ends 44, a retainer 46 and a blocking part 48.

The main body 40 includes an outer part 50 and a base part 52. The outer part 50 is preferably provided with a contoured shape that includes an aperture that defines the first tie-down fitting 42 and a pair of hook-like shapes that define each of the tie-down ends 44. The outer part 50 also includes a recess 54 that extends through the outer part 50. The purpose of the recess 54 is explained in greater detail below.

The first tie-down fitting 42 is ring-shaped portion of the main body 40 having an aperture that is dimensioned to receive a rope, hook or chain (not shown) that is used to secure cargo within the cargo area 16 in a conventional manner. Each of the pair of tie-down ends 44 is configured to receive a loop of rope or hook to similarly secure cargo within the cargo area 16 of the vehicle 10.

The base part 52 is preferably integrally formed with the outer part 50, but can alternatively be a separate element fixedly attached to the outer part 50. The recess 54 of the outer part 50 of the main body 40 defines a gap between the base part 52 and the outer part 50.

The base part 52 is configured to contact and clamp to the track 12, as described in greater detail below. As best shown in FIGS. 6-20, the base part 52 includes a clamping surface 60 (FIGS. 8-12), an aperture 62 (FIGS. 6 and 11-17) and a recess 64 (FIGS. 12-17). As best shown in FIGS. 6 and 14, the aperture 62 extends between the clamping surface 60 and the recess 54 of the outer part 50. The recess 64 is configured to at least partially retain and support elements of the blocking part 48, as described below. As shown in FIGS. 12-17 and 20, the recess 64 has a generally uniform width with a narrowed upper portion 64a, as described below along with a description of the blocking part 48.

As best shown in FIG. 4, the retainer 46 includes a clamping member 70 and a tightening member 72. The clamping member 70 includes a threaded portion 74 and a clamping portion 76. The clamping portion 76 is basically an elongated bar that includes a pair of parallel grooves 78 that are spaced apart from one another by a distance that is preferably equal to the distance between the inwardly extending projections 36 of the track 12. The threaded portion 74 and the clamping portion 76 are fixedly attached to one another. The clamping portion 76 has a width $W_2$ and a length $L_1$. The width $W_2$ of the clamping portion 76 is preferably about the same or slightly less that the width $W_1$ of the slot 38 of the track 12. However, the length $L_1$ of the clamping portion 76 is greater than the width $W_1$ of the slot 38 of the track 12.

The threaded portion 74 of the clamping member 70 is fitted through the aperture 62 such that extends into the recess 54 of the main body 40 of the tie-down assembly 14.

Figure 9:
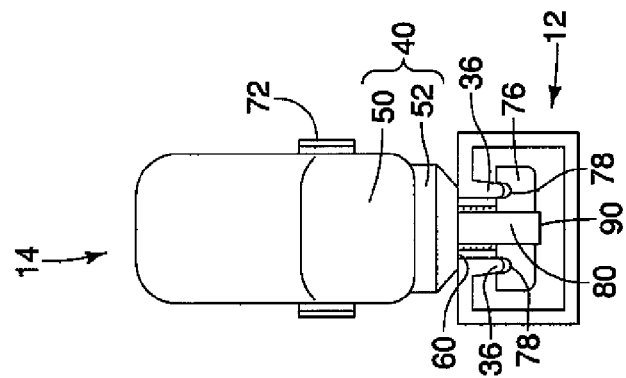
FIG. 9 is an end view of the track similar to FIG. 8, with the tie-down assembly installed to the track showing details of the retainer separated from the track allowing positioning of the tie-down assembly along the length of the track, but with the blocking mechanism in the blocked orientation preventing rotation of the tie-down assembly relative to the track in accordance with one embodiment of the present invention.
Figure 8:
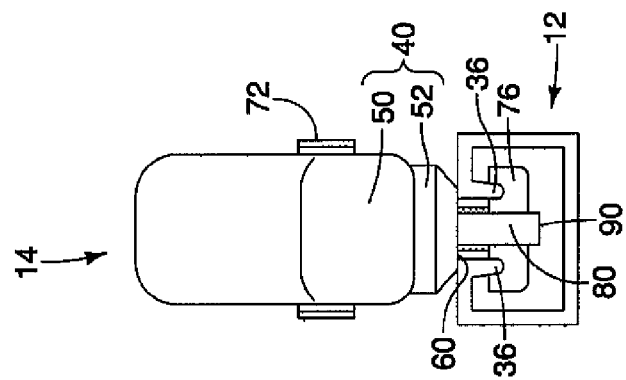
FIG. 8 is an end view of the track with the tie-down assembly installed to the track showing details of the retainer clamped to portions of the track in accordance with one embodiment of the present invention.

The tightening member 72 is preferably a round disk-shaped member with a central threaded aperture and a contoured outer circumferential surface. The tightening member 72 is disposed within the recess 54 of the main body 40 of the tie-down assembly 14. The threaded portion 74 of the clamping member 70 is threadedly engaged within the central threaded aperture of the tightening member 72. Rotation of the tightening member 72 causes movement of the clamping member 70 relative to the clamping surface 60 of the base part 52 of the main body 40 of the tie-down assembly 14. Thus, when the clamping member 70 is inserted within the hollow interior of the track 12 as shown in FIGS. 6 and 8, rotation of the tightening member 72 in a tightening direction clamps the tie-down assembly 14 to the track 12. In other words, the inwardly extending projections 36 become clamped between the clamping member 70 and the clamping surface 60 of the base part 52 of the main body 40 of the tie-down assembly 14. Sliding movement of the tie-down assembly 14 relative to the track 12 is prevented once the tightening member 72 is tightened. Rotation of the tightening member 72 in a loosening direction releases the clamping force applied by the clamping member 70, and the clamping member 70 separates from the track 12, as shown in FIG. 9. With the clamping member 70 in a loosened orientation shown in FIG. 9, the tie-down assembly 14 is able to slide to different positions along the track 12.

As a result, the retainer 46 is supported to the tie-down fittings 42 and 44 via base part 52 and the tightening member 72. Hence, it is possible to selectively tighten the clamping member 70 relative to the main body 40 in order to secure the tie-down assembly 14 to various positions along the length of the track 12. Further, the retainer 46 is operable with respect to the track 12 between a securing orientation (FIG. 8) retaining the tie-down assembly 14 at selected locations along the track 12 and a position adjustment orientation (FIG. 9) releasing the tie-down assembly 14 for movement within and along the length of the track 12.

A description of the blocking part 48 is now provided with specific reference to FIGS. 10-20. The blocking part 48 is movably coupled with respect to the tie-down fittings 42 and 44 of the tie-down assembly 14 for movement between a blocked orientation (extending out from the tie-down assembly 14) depicted in FIGS. 4, 7-10, 12, 14 and 15 and an unblocked orientation (retracted into the tie-down assembly 14) depicted in FIGS. 11, 17, 19 and 20. The blocking part 48 basically includes a stop block 80, a first biasing element 82, a release member 84 and a second biasing element 86.

Figure 20:
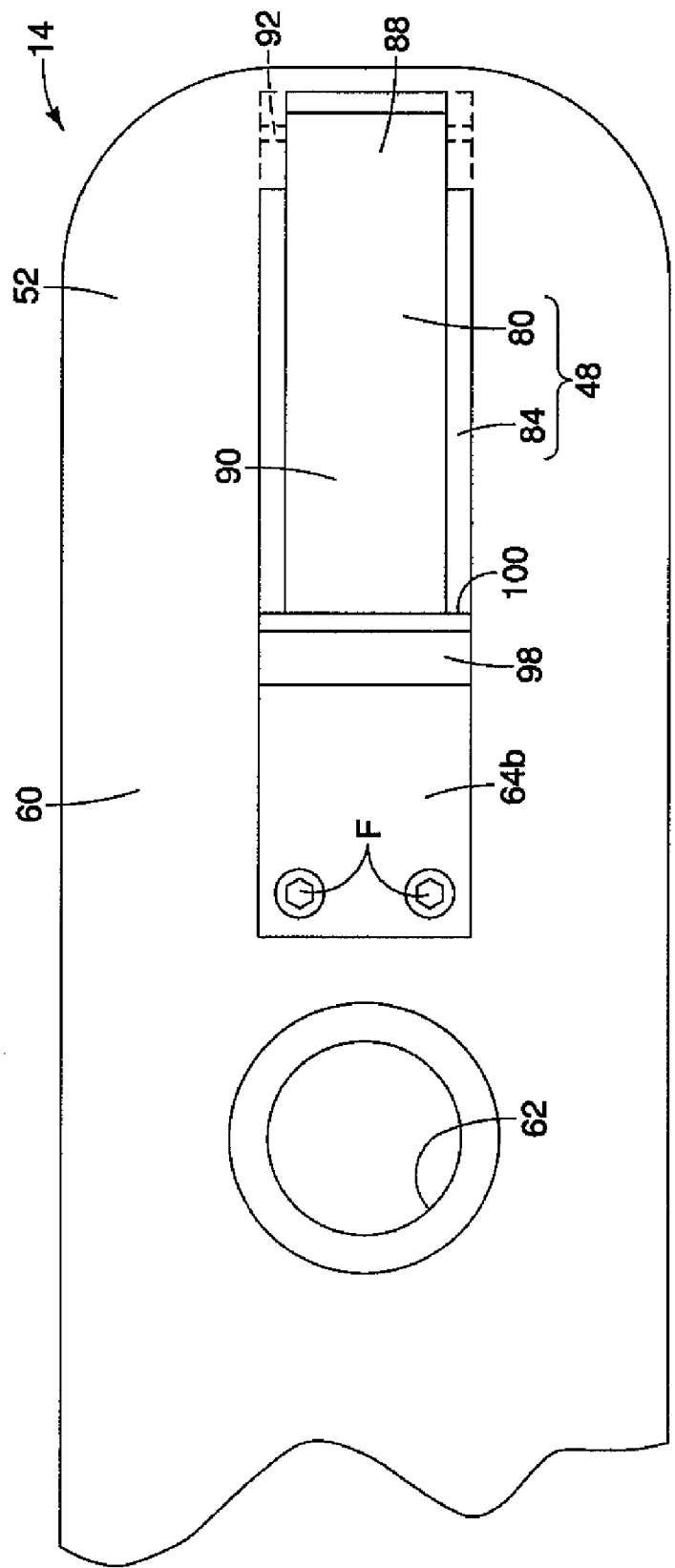
FIG. 20 is a bottom view of a portion of the tie-down assembly showing the blocking mechanism in the unblocked orientation in accordance with one embodiment of the present invention.

The stop block 80 is an elongated bar or rod that has a first end 88 and a second end 90. The first end 88 is pivotally supported within the recess 64 of the base part 52 of the main body 40 of the tie-down assembly 14 by a pivot pin 92 that extends through the base part 52 as indicated in FIGS. 13-18. The first biasing element 82 is at least partially disposed about the pivot pin 92 and is arranged to apply a biasing force on the stop block 80 to urge the stop block 80 to move from the unblocked orientation towards the blocked orientation. In the unblocked orientation, the stop block 80 is completely disposed within the recess 64 as shown in FIGS. 17 and 20.

Figure 13:
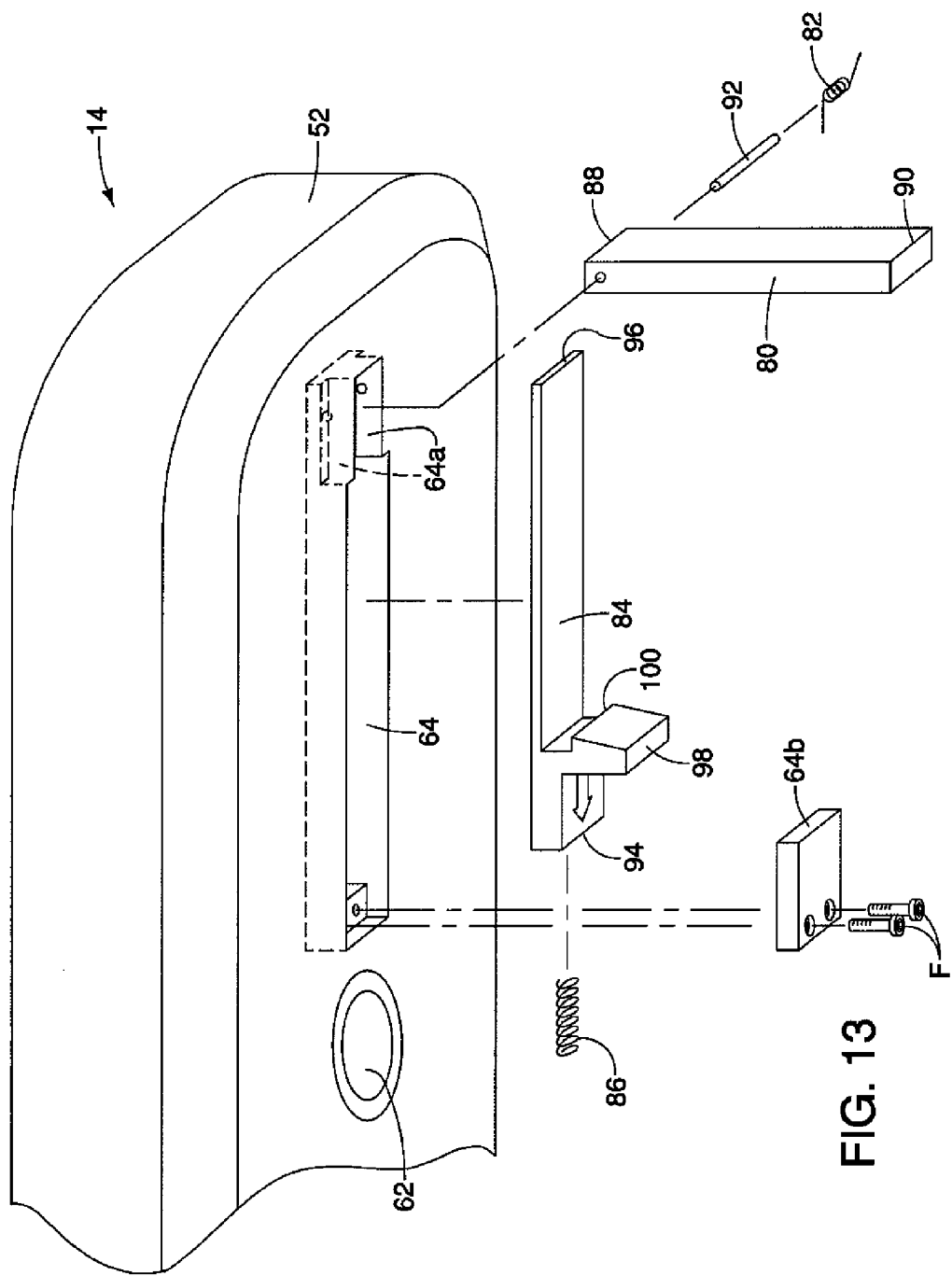
FIG. 13 is another exploded perspective view of the bottom of the tie-down assembly with the retainer removed showing the recess in the tie-down assembly and various elements of the blocking mechanism removed from the recess in accordance with one embodiment of the present invention.
Figure 14:
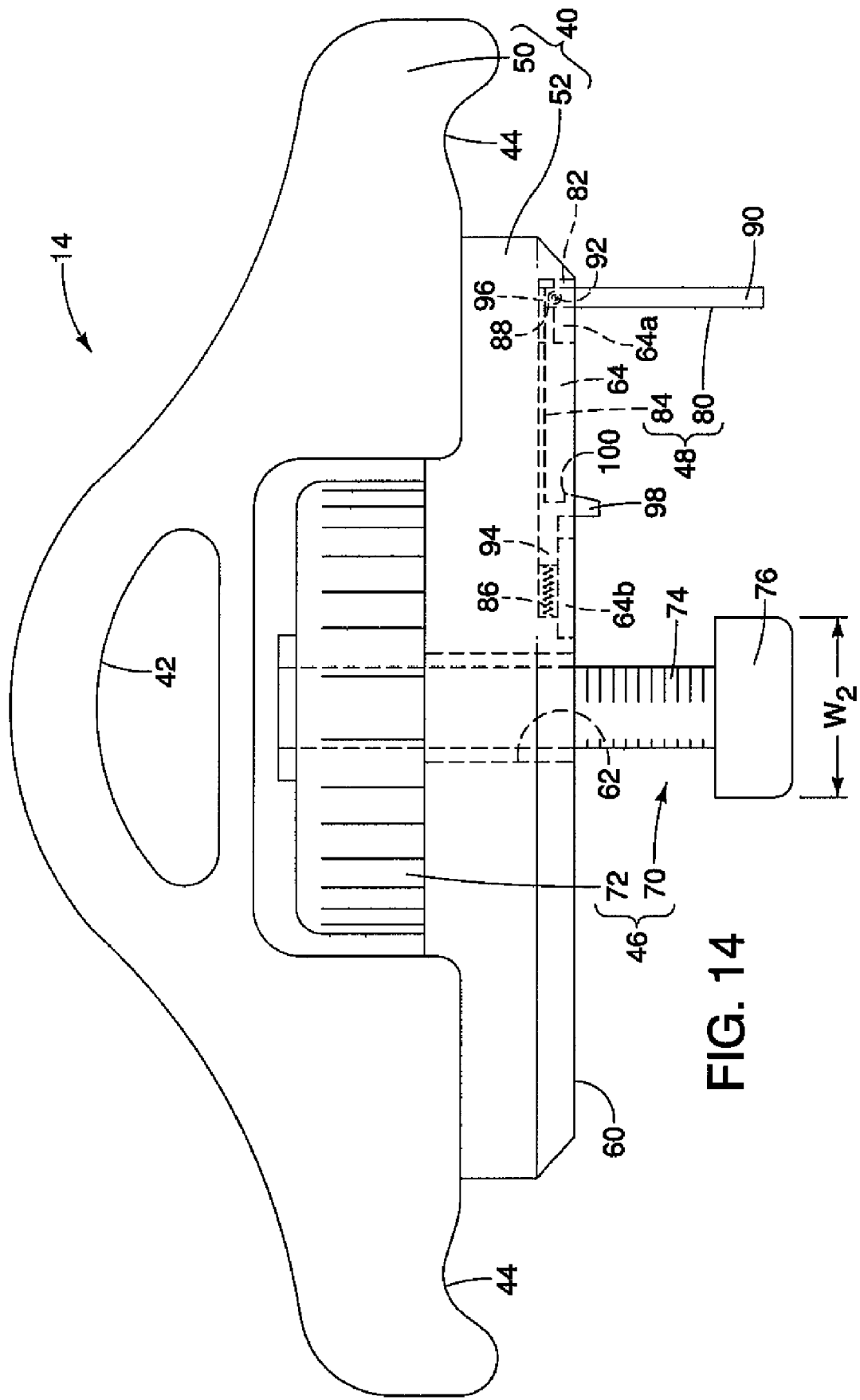
FIG. 14 is a side view of the tie-down assembly shown removed from the track showing the various elements of blocking mechanism in phantom with the blocking mechanism protruding from the tie-down assembly in the blocked orientation in accordance with one embodiment of the present invention.

As shown in FIG. 13, the release member 84 is a long generally flat member that includes a first end 94 and a second end 96. The first end 94 includes a release tab 98 and a restraining projection 100. The release member 84 is slidably disposed within the recess 64 with only the release tab 98 and restraining projection 100 extending beyond the clamping surface 60 of the base part 52. The release member 84 is configured to engage the second end 90 of the stop block 80 to selectively retain the stop block 80 in the unblocked orientation against the biasing force of the first biasing element 82, as shown in FIG. 17. The first end 94 is retained within the recess 64 by a plate 64b that is fixed to the base part 52 by fasteners F, as indicated in FIG. 13.

The second biasing element 86 is disposed within the recess 64 of the base part 52 between the second end 96 and a wall portion of the recess 64. The second biasing element 86 is arranged to apply a biasing force on the release member 84 urging the release member towards engagement with the stop block 80 to hold the stop block 80 in position. Specifically, with the stop block 80 in the extended orientation as shown in FIGS. 14 and 15, the release member 84 is biased to move between the first end 88 of the stop block 80 and the recess 64. Thus, with the release member 84 positioned as shown in FIG. 15, the stop block 80 is prevented from retracting back into the recess 64. The release member 84 must be moved toward the left as shown in FIG. 16 away from the first end 88 of the stop block 80 in order for the stop block 80 to be free to pivot about the pivot pin 92 toward the blocked orientation shown in FIG. 16. Further, with the stop block 80 in the unblocked position, the second biasing element 86 biases the release member 84 such that the restraining projection 100 extends over a portion of the se cond end 90 of the stop block 80 thereby retaining it in the unblocked orientation, as shown in FIG. 17.

Figure 7:
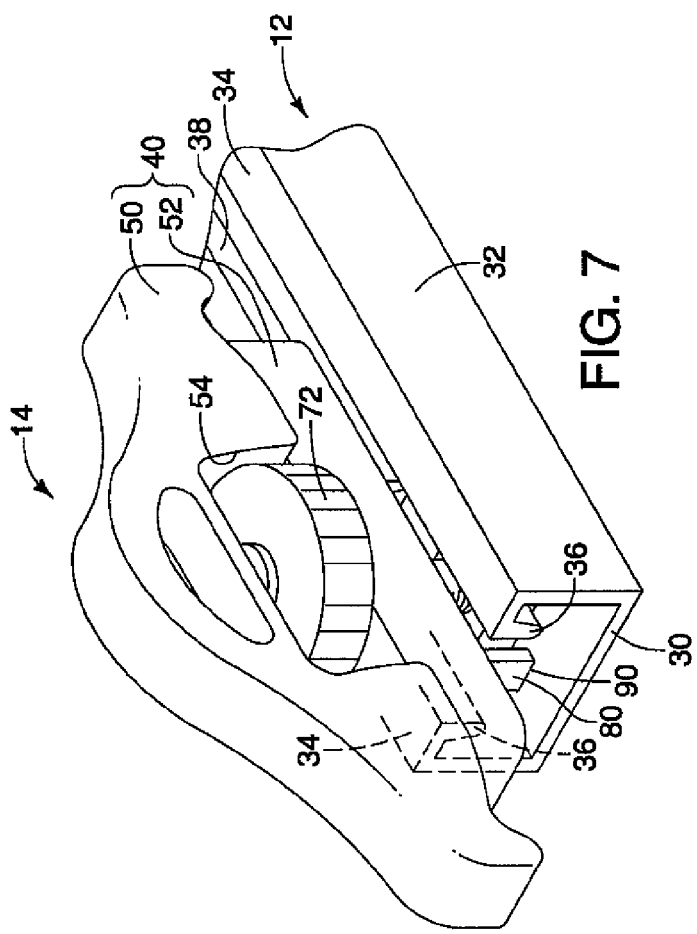
FIG. 7 is another perspective view of the portion of the track and the tie-down assembly similar to FIG. 6, showing the tie-down assembly installed to the track with a blocking mechanism of tie-down assembly in a blocked orientation in accordance with one embodiment of the present invention.
Figure 11:
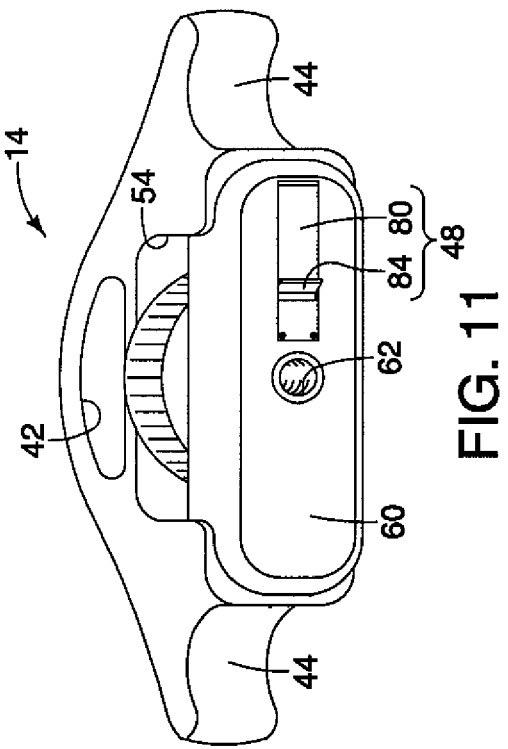
FIG. 11 is a perspective bottom view of the tie-down assembly with the retainer removed showing details of the blocking mechanism in accordance with one embodiment of the present invention.
Figure 10:
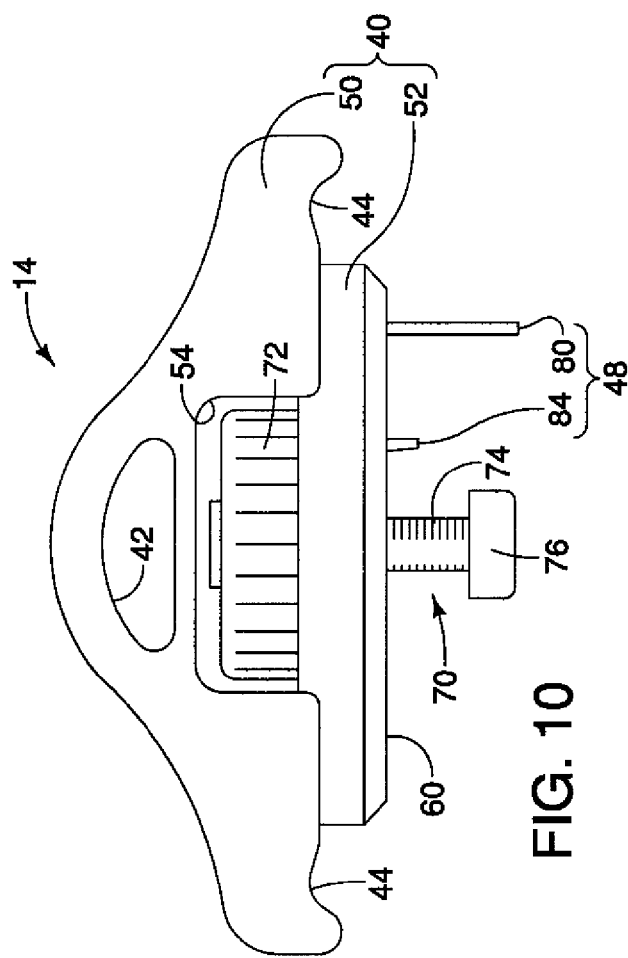
FIG. 10 is a side view of the tie-down assembly shown removed from the track showing the blocking mechanism protruding from the tie-down assembly in the blocked orientation in accordance with one embodiment of the present invention.
Figure 12:
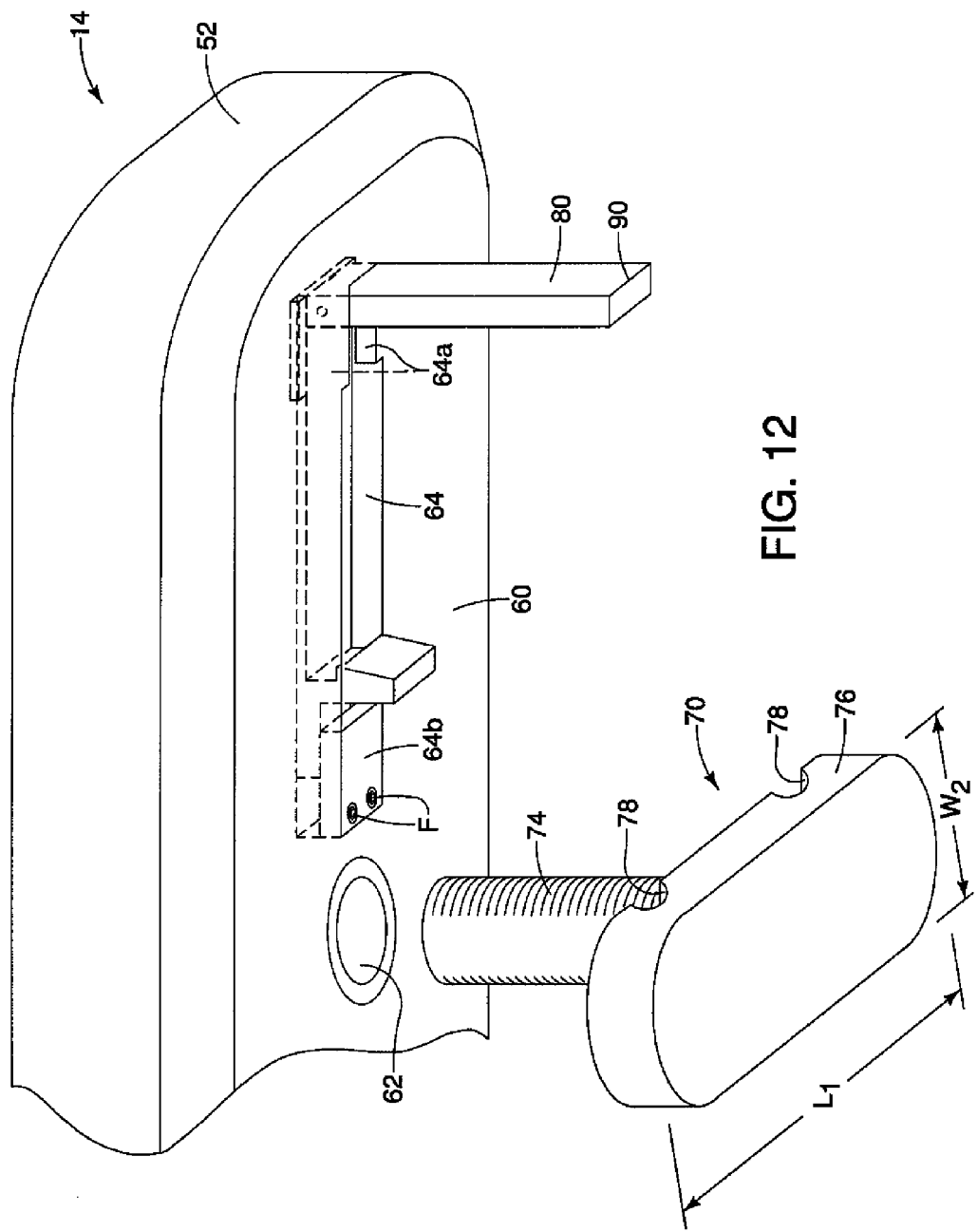
FIG. 12 is an exploded perspective view of the bottom of the tie-down assembly showing a recess of the tie-down assembly and various elements of the blocking mechanism with the blocking mechanism in the blocked orientation in accordance with one embodiment of the present invention.

As described above, the stop block 80 is retained within the recess 64 and can pivot or extended to the extended orientation (blocking orientation) such that in the extended orientation the stop block 80 extends outward perpendicular to a length of the recess 64. With the stop block 80 of the blocking part 48 in the extended orientation, the stop block 80 extends into the elongated slot 38 of the track 12, as shown in FIGS. 7, 8 and 9. As a result, tie-down assembly 14 cannot be rotated relative to the track 12. Hence, the clamping portion 78 of the clamping member 70 cannot be rotated and removed from the track 12. With the stop block 80 of the blocking part 48 in the extended orientation (blocking orientation), the tie-down assembly 14 can only be removed from the track 12 via the open end 30 of the track 12. Hence, with the tailgate 24 closed (FIG. 1) and the stop block 80 in the extended orientation, the tie-down assembly 14 cannot be removed from the track 12. With the tailgate 24 opened (FIG. 2) and the stop block 80 in the extended orientation, the tie-down assembly 14 can be removed from the track 12 via the open end 30 of the track 12.

In other words, the blocking part 48 is movably coupled with respect to the tie-down assembly 14 (and the tie-down fitting 42) between an unblocked orientation and a blocked orientation such that the tie-down assembly 14 is removable from the track 12 by rotational movement when the blocking part 48 is in the unblocked orientation and such that the tie-down assembly 14 is not removable from the track 12 by the rotational movement in when the blocking part 48 is in the blocked orientation. Further, the tie-down assembly 14 is removable from the track 12 by movement in a direction perpendicular to the longitudinal direction of the track 12 when the blocking part 48 is in the unblocked orientation and such that the tie-down assembly 14 is not removable from the track 12 by movement in the direction perpendicular to the longitudinal direction of the track 12 when the blocking part is in the blocked orientation.

Various portions of the vehicle 10 and cargo area 16 of the vehicle 10 are conventional components that are well known in the art. Since vehicles and cargo areas of pickup trucks are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A tie-down assembly comprising:
   a main body including a tie-down fitting;
   a retainer supported by the main body and being configured to be fitted into an elongated slot, the main body is rotatable relative to the elongated slot between a removable orientation and a non-removable orientation; and
   a blocking part movably coupled with respect to the main body, the blocking part being movable between a blocked orientation, in which the blocking part prevents rotation of the main body, and an unblocked orientation.

2. The tie-down assembly according to claim 1, wherein the blocking part includes a stop block pivotally supported by the main body, and a first biasing element arranged to apply a biasing force on the stop block to urge the stop block from the unblocked orientation towards the blocked orientation.

3. The tie-down assembly according to claim 2, wherein the blocking part includes a release member that engages the stop block to selectively retain the stop block in the unblocked orientation against the biasing force of the first biasing element.

4. The tie-down assembly according to claim 3, wherein the blocking part includes a second biasing element arranged to apply a biasing force on the release member to urge the release member towards engagement with the stop block to hold the stop block in the unblocked orientation.

5. The tie-down assembly according to claim 1, wherein the blocking part includes a stop block pivotally supported by the main body, and the main body includes a recess with the stop block having a first end supported in the recess such that in the unblocked orientation the stop block is retained within the recess and in the blocked orientation the stop block extends outward perpendicular to a length of the recess.

6. The tie-down assembly according to claim 1, wherein the blocking part prevents rotation of the main body from the non-removable orientation to the removable orientation while the blocking part is in the blocked orientation.

7. A tie-down assembly comprising:
   a main body including a tie-down fitting;
   a retainer supported by the main body and being configured to be fitted into an elongated slot, the retainer including a clamping member; and
   a blocking part movably coupled with respect to the main body, the blocking part being movable between a blocked orientation, in which the blocking part prevents rotation of the main body, and an unblocked orientation.

8. The tie-down assembly according to claim 7, wherein the retainer includes a tightening member that tightens the clamping member relative to the main body.

9. The tie-down assembly according to claim 7, wherein the clamping member is configured to pass through the elongated slot when the main body is in a removable orientation.

10. A tie-down assembly comprising:
    a main body including a tie-down fitting, the main body being rotatable relative to an elongated slot between a removable orientation and a non-removable orientation;
    a retainer supported by the main body and configured to be fitted into the elongated slot; and
    a blocking part movably coupled to the tie-down fitting, the blocking part being movable between an unblocked orientation and a blocked orientation, with the blocking part preventing rotation of the main body from the non-removable orientation to the removable orientation when in the blocking orientation.

11. The tie-down assembly according to claim 10, wherein the blocking part includes a stop block pivotally supported by the main body, and a first biasing element arranged to apply a biasing force on the stop block to urge the stop block from the unblocked orientation towards the blocked orientation.

12. The tie-down assembly according to claim 11, wherein the blocking part includes a release member that engages the stop block to selectively retain the stop block in the unblocked orientation against the biasing force of the first biasing element.

13. The tie-down assembly according to claim 12, wherein the blocking part includes a second biasing element arranged to apply a biasing force on the release member to urge the release member towards engagement with the stop block to hold the stop block in the unblocked orientation.

14. The tie-down assembly according to claim 10, wherein the blocking part includes a stop block pivotally supported by the main body, and the main body includes a recess with the stop block having a first end supported in the recess such that in the unblocked orientation the stop block is retained within the recess and in the blocked orientation the stop block extends outward perpendicular to a length of the recess.

15. The tie-down assembly according to claim 10, wherein the retainer includes a clamping member.

16. The tie-down assembly according to claim 15, wherein the retainer includes a tightening member that tightens the clamping member relative to the main body.

17. The tie-down assembly according to claim 15, wherein the clamping member is configured to pass through the elongated slot when the main body is in the removable orientation.

* * * * *